Nov. 15, 1966     E. R. BOOTS ETAL     3,285,310

SELF-LOCKING MALE THREADED FASTENERS

Filed Aug. 11, 1964

INVENTORS
EDMUND R. BOOTS
HOWARD I. PODELL
BY

THEIR ATTORNEYS

United States Patent Office 3,285,310
Patented Nov. 15, 1966

3,285,310
SELF-LOCKING MALE THREADED FASTENERS
Edmund R. Boots, New York, and Howard I. Podell, Larchmont, N.Y., assignors, by mesne assignments, to United Shoe Machinery Corporation, Boston, Mass., a corporation of New Jersey
Filed Aug. 11, 1964, Ser. No. 388,797
2 Claims. (Cl. 151—7)

This invention relates to improvements in self-locking fastening devices and particularly to improvements in self-locking male threaded fastening elements, such as, for example, bolts, screws, studs, turnbuckles and the like.

Self-locking fastening devices which contain an insert of a resilient deformable plastic material such as vulcanized fiber, nylon, "Kel F" and the like are well known. One such fastening device is characterized by a circular recess in thread-containing portion of the fastening device in which is received a pellet of the resilient, deformable material. Fastening devices of this type are satisfactory so long as the fastening device is desgned so that when a nut or other complementally threaded member is applied and tightened, it overlies and compresses the pellet. Other types of screws have an elongated strip of the resilient, deformable plastic material disposed in a groove extending lengthwise of the threaded portion of the screw. The use of a strip as compared with a pellet, however introduces certain difficulties in the manufacture and use of the fastening device. When the recess is milled or otherwise cut into the threaded portion of the fastening device, a substantial amount of the material is removed and all of the threads along the length of the recess or groove are interrupted. If the groove is reduced in cross-sectional dimensions to avoid weakening of the screw the amount of resilient, deformable material which can be accommodated in the groove is proportionally reduced with a resulting loss of initial and prevailing torques. Moreover, the insert has a tendency to be displaced lengthwise of the groove or recess when a nut is threaded onto it with the result that the insert may become dislodged and the self-locking action lost. To reduce the endwise displacement of the insert strips of larger dimensions than the recess or groove have been introduced into the slot with the result that portions of the insert are forced laterally between the threads on opposite sides of the recess. The partial interlocking of the insert material and the threads thus tends to resist endwise displacement of the insert. However, uncontrolled spreading of the material between the threads has a tendency to produce a variable and uncontrollable locking torque. Moreover, the tendency of some types of resilient insert material such as nylon or "Kel F" to recover to their initial shape has a tendency to cause the insert to be displaced radially from the slot or recess with the result that frequently the insert and its locking actions are lost. Radial displacement can be overcome by undercutting the sides of the groove or deforming the crests of the threads at the edges of the grooves, but these operations require additional steps, equipment and cost.

In accordance with the present invention, an improved form of locking device is provided which overcomes the deficiencies of the prior art devices noted above and provides a fastening device having a much higher initial and prevailing locking torque and maintains a greater continuity of the threads of the fastening device along its length.

More particularly, in accordance with the invention, the new locking device includes a plurality of separate recesses disposed in a row along the length of a threaded portion of the fastening device and a continuous strip of resilient, deformable plastic material having portions embedded in the recesses and spanning the spaces between the recesses and impaled on the threads between the recesses. In this way, the insert is secured against endwise and radial displacement by firm engagement with portions thereof which are gripped on all sides by the sides of the recesses and is further retained in position by the threads between the several recesses in the row. Inasmuch as the recesses are spaced apart, continuous threads remain between the recesses and these in turn reduce the tendency of the threads to become deformed, aid in the turning of a nut or the like onto the screw and provide a stronger fastening device. Moreover, the portions of the insert embedded in the recesses and overlying the threads between the recesses have a sufficient area and volume to assure a very high locking initial torque and a continuous engagement between the insert material and the threads of a nut or other female threaded member.

Another advantage of the new fastener is that a satisfactory locking torque is obtained even with complemental elements in which the threaded portion thereof is distorted in shape, as is, for example, commonly the case with weld nuts and other stamped or coined nuts.

For a better understanding of the present invention, reference may be had to the accompanying drawing, in which—

Figure 2:
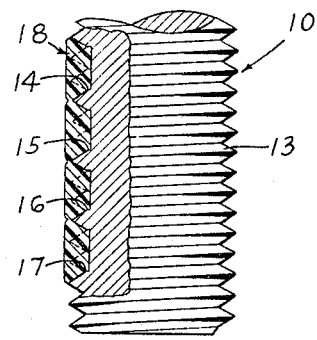
FIGURE 2 is a view in section taken on line 2—2 of FIGURE 1.

A typical fastening device, illustrative of the invention, is a screw 10 having a hexagonal head 11, a shank 12 having at least a portion thereof provided with threads 13 of any suitable pitch, size and form. Along the length of the threaded portion of the screw 10 are a series of four recesses 14, 15, 16 and 17, or more or fewer recesses, as may be desired. The recesses 14 to 17 may be formed by drilling or as explained hereinafter by a punching or coining operation. When the recesses 14 to 17 are formed by drilling, they may all be of the same diameter and depth as shown in FIGURE 2. Suitable drills for forming recesses with flat or conical bottoms can be used. The recesses 14 to 17 are shown as having flat bottoms. The recesses 14 to 17 are spaced apart lengthwise of the screw so that they do not intersect or communicate with each other. Excellent results are obtained by spacing the recesses about one thread width or more apart so that at least the crest of one thread is disposed between the recesses. After the recesses are formed, a strip or rod of resilient, deformable plastic, such as nylon, of uniform width and length is forced by means of a suitable die against the screw so that portions of the insert 18 are forced into the recesses 14 to 17 while other portions are impaled upon the threads 13 between the recesses. The dimensions of the insert 18 are such that a surplus of material is provided which overflows and is displaced laterally on all sides of the recesses 14 and 15 between the threads. As shown in FIGURE 2, the volume of the insert should be such that it extends outwardly to about or beyond the crests of the threads 13 so that the continuity of the insert is maintained throughout its length. In this way, when a complementally threaded member such as a nut or a threaded recess receives the screw 10, the nut will engage and overlie at least a part of the insert in any of the usable positions of the nut along the length of the threaded portion of the shank of the screw. As illustrated in FIGURE 2, the insert material tends to form domes or bulges in the area outwardly of the recesses 14 to 17, thereby exposing large surface areas for engagement with the complemental nut even when the threaded bore of the nut is out of round or otherwise distorted and affording a very strong compressive stress with resulting high initial and prevailing locking torques. Inasmuch as portions of the insert along its length are embedded in the recesses 14, 15, 16 and 17 and the portions in between the recesses are impaled on the threads between the recesses bodily, endwise movement of the insert is effectively precluded. Moreover, due to the strong frictional engagement between the walls of the recesses and the insert material therein, the insert cannot be dislodged easily from the recesses.

Due to the separation of the recesses 14 to 17, the screw is not greatly weakened by the presence of the recesses and continuity of the threads between the recesses is assured.

Figure 1:
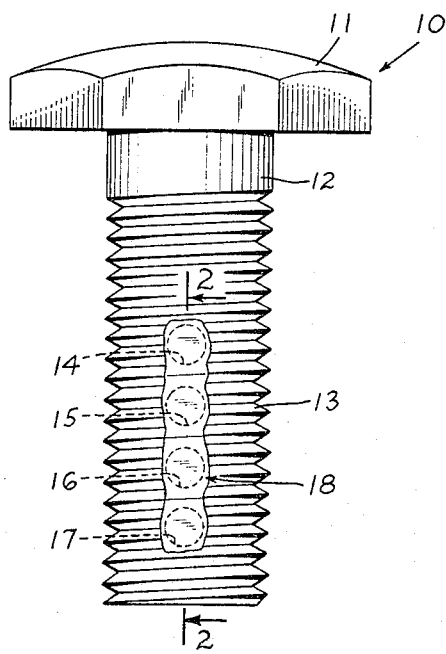
FIGURE 1 is a front elevational view of a typical threaded fastening device embodying the present invention.

While, as shown in FIGURES 1 and 2, the recesses 14 to 17 are of the same diameter and depth and extend into the shank portion of the screw behind the threads, the recesses may vary in their dimensions and may terminate at about or only slightly below the roots of the threads 13.

Figure 3:
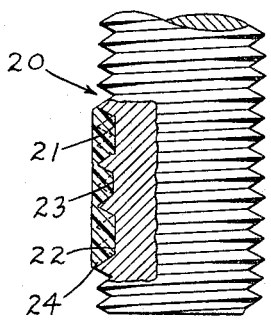
FIGURE 3 is a view in longitudinal section of a modified form of fastening device embodying the invention.

Referring now to FIGURE 3, a modified form of screw 20 contains larger end recesses 21 and 22 and a smaller recess 23 between them. This arrangement of the recesses is particularly advantageous in screws in which the recesses are formed by a punching or coining operation. It is recognized that when a metal article such as a screw has a recess or groove punched therein, metal is displaced which results in a deformation in the screw and its threads. In larger screws, the displacement of the metal is not so much of a problem, but in smaller screws, it is not practical to punch or coin a row of recesses of the same size and of sufficient size for retention of the insert material along the length of the screw. The presence of the intermediate recesses and the material displaced therefrom causes a serious deformation of the threads between the recesses for the reason that the punches used in forming, for example, the end recesses 21 and 22 simultaneously, preclude the endwise displacement of the metal of the screw between them. If one or more recesses of the same size are punched simultaneously between the end recesses, excessive thread deformation occurs. It is for this reason that the recess 23 is made of smaller diameter and, if necessary, of shallower depth than the recesses 21 and 22. Nevertheless, the presence of the smaller recess 23 between the larger recesses 21 and 22 aids in anchoring the insert 24 against radial and endwise displacement and also renders the locking torque along the length of the insert more uniform because of the presence of a substantial body of the deformable material in and overlying the recess 23 and between the recesses 21 and 22. It will be understood that when the recesses are coined, they can be of any desired cross-sectional shape such as oval, regularly or irregularly polygonal or circular.

Figure 4:
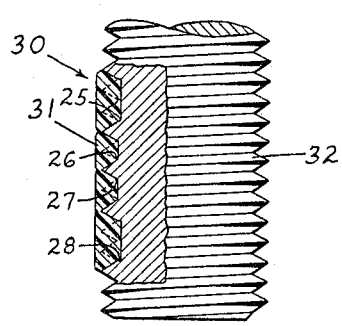
FIGURE 4 is a view in longitudinal section of another form of fastening device embodying the present invention.

FIGURE 4 shows another form of screw in which four recesses 25, 26, 27 and 28 are punched in the screw 30 along its length. In this form of screw, the recesses 26 and 27 are shallower than the recesses 25 and 28, and, if necessary, may for the reasons pointed out above be of smaller diameter. The insert 3 is embedded in the recesses and impaled on the threads 32 in the manner described above.

An exemplary screw of the type embodying the invention may have 7/16–20 thread and a major diameter of .432 inch. The screw is provided with four holes, each .081 inch in diameter and having a depth of .065 inch. A strip of nylon having a diameter of .080 and a length of .375 inch is compressed into the holes and spread between the threads adjacent the hole. Five of these screws were subjected to test to determine their locking torques. As shown in the following table, customer's specifications for maximum installation torque is 75, a minimum of 17 on first removal and 12 on fifth removal measured in pound inches. The maximum installation torque, static and prevailing torques of the five test screws on first and fifth removals are indicated in the following table.

Table I

| No. | Diameter of screw measured over insert | Initial Inst. Max. (Spec. 75) | First Removal | | Fifth Removal | |
|---|---|---|---|---|---|---|
| | | | Static Min. (Spec. 17) | Prev. Min. | Static Min. (Spec. 12) | Prev. Min. |
| 1 | .445 | 65.0 | 45.0 | 25.0 | 28.0 | 16.0 |
| 2 | .447 | 70.0 | 60.0 | 35.0 | 36.0 | 20.0 |
| 3 | .446 | 68.0 | 50.0 | 32.0 | 30.0 | 19.0 |
| 4 | .444 | 68.0 | 47.0 | 30.0 | 23.0 | 17.0 |
| 5 | .445 | 75.0 | 60.0 | 30.0 | 40.0 | 32.0 |

It will be apparent that all of the five screws satisfied the customer's specifications for maximum installation torque and far exceeded the static torques on first and fifth removals, thereby showing the utility of screws of the type embodying the invention in heavy duty use for many purposes in the automotive, aircraft and other fields.

In another series of tests, screws of the dimensions shown in the following table and having holes therein of the same dimensions and containing a strip of the same diameter as the screws in Table I were tested with weld nuts to determine their static and prevailing torques. Prevailing torque is measured during at least a full revolution of the screw. Manufacturers using self-locking fasteners now require relatively high prevailing torques, for example, 12 inch pounds. When prior self-locking screws are used with weld nuts, the deformation of the threaded holes in the weld nuts is so great that the prevailing Table II

| No. | Major Dia. | Meas./ over pellet | Initial Inst. Max. (Spec. Comm. 75) | First Removal | | Fifth Removal | |
|---|---|---|---|---|---|---|---|
| | | | | Static Min. (Spec. Comm. 17) | Prev. Min. | Static Min. (Spec. Comm. 12) | Prev. Min. |
| 1 | .440 | .442 | 55 | 35 | 20 | 20 | 10 |
| 2 | .440 | .440 | 70 | 45 | 30 | 25 | 15 |
| 3 | .438 | .442 | 55 | 35 | 20 | 20 | 10 |
| 4 | .439 | .441 | 60 | 40 | 25 | 20 | 10 |
| 5 | .438 | .438 | 50 | 35 | 25 | 20 | 10 |
| 6 | .439 | .441 | 60 | 45 | 25 | 20 | 10 |
| 7 | .438 | .439 | 50 | 40 | 20 | 20 | 10 |
| 8 | .438 | .436 | 65 | 50 | 30 | 30 | 20 |
| 9 | .438 | .438 | 60 | 35 | 20 | 25 | 15 |
| 10 | .438 | .437 | 45 | 30 | 20 | 14 | 8 |
| Max | | | 70 | 45 | 30 | 30 | 20 |
| Min | | | 45 | 30 | 20 | 14 | 8 |
| Avg | | | 57 | 39 | 23.5 | 21.4 | 11.8 | torques drop to zero during some part of the revolution of the fastener undergoing the test. With our new fasteners, a satisfactorily high prevailing torque is obtained, as shown in the preceding table.

It will be understood that screws and other fastening devices embodying the present invention are susceptible to considerable modification in size, the types of threads used thereon and the number, shapes and sizes of the recesses therein. Accordingly, the forms of the invention disclosed herein should be considered as illustrative and the invention should not be considered as limited other than by the terms of the following claims.

We claim:

1. A self-locking fastening device comprising a member having a shank, threads on said shank, at least three separate, generally axially aligned recesses intersecting threads on said shank and extending radially inwardly slightly beyond the roots of said threads and spaced apart lengthwise of said shank by at least two intervening portions having at least one thread thereon, each of said recesses having an axial dimension greater than the pitch of said threads, and a single strip of resilient, deformable synthetic plastic material extending lengthwise of said shank and spanning said recesses and said intervening portions and being embedded in said recesses and impaled on said at least two threads on said intervening portions, said material extending radially outwardly beyond the crests of said threads and laterally beyond the edges of said recesses.

2. A self-locking fastening device comprising a member having a shank, threads on the shank, at least three separate generally axially aligned recesses intersecting threads on said shank and extending inwardly, said recesses being spaced apart lengthwise of said shank from each other by at least one intervening thread crest, and having a width measured axially of the shank greater than the thread pitch, and a single strip of resilient deformable synthetic plastic material extending lengthwise of said shank and spanning said recesses and said intervening portions and being embedded in said recesses and impaled on at least two intervening thread crests, said material extending laterally beyond the edges of said recesses.

References Cited by the Examiner
UNITED STATES PATENTS

| | | | |
|---|---|---|---|
| 3,010,503 | 11/1961 | Beuter | 151—7 |
| 3,149,654 | 9/1964 | Podell | 151—7 |
| 3,176,744 | 4/1965 | Brightman | 151—7 |
| 3,182,703 | 5/1965 | Smyth | 151—7 |

CARL W. TOMLIN, *Primary Examiner.*

R. S. BRITTS, *Assistant Examiner.*